United States Patent
Hu et al.

(10) Patent No.: US 8,942,966 B2
(45) Date of Patent: Jan. 27, 2015

(54) METHOD FOR PARAMETERIZING AND MORPHING STOCHASTIC RESERVOIR MODELS

(75) Inventors: Lin Ying Hu, Katy, TX (US); Yongshe Liu, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 365 days.

(21) Appl. No.: 13/271,727

(22) Filed: Oct. 12, 2011

(65) Prior Publication Data

US 2012/0101786 A1 Apr. 26, 2012

Related U.S. Application Data

(60) Provisional application No. 61/405,062, filed on Oct. 20, 2010.

(51) Int. Cl.
*G01V 99/00* (2009.01)
*G06F 17/18* (2006.01)
*G06F 19/00* (2011.01)

(52) U.S. Cl.
CPC ........ *G01V 99/005* (2013.01); *G01V 2210/665* (2013.01)
USPC .......................................................... 703/10

(58) Field of Classification Search
CPC ............ G01V 11/00; G01V 2210/614; G01V 2210/665; G01V 1/28; G01V 1/282; G01V 1/30; G01V 99/00; G01V 99/005; G06F 2217/16; G06F 17/5009
See application file for complete search history.

(56) References Cited

U.S. PATENT DOCUMENTS

| | | | |
|---|---|---|---|
| 5,838,634 | A | 11/1998 | Jones et al. |
| 6,522,973 | B1 | 2/2003 | Tonellot et al. |

(Continued)

FOREIGN PATENT DOCUMENTS

| | | | |
|---|---|---|---|
| WO | 2009138290 | 11/2009 | |
| WO | WO 2009138290 A2 * | 11/2009 | ............. G01V 11/00 |

OTHER PUBLICATIONS

Ding et al., History Matching Geostatistical Model Realizations Using a Geometrical Domain Based Parameterization Technique, Math Geosci (2010) 42: 413-432.*

(Continued)

*Primary Examiner* — Kamini S Shah
*Assistant Examiner* — Michael P Healey
(74) *Attorney, Agent, or Firm* — ConocoPhillips Company

(57) ABSTRACT

A method for creating a modified realization of a geostatistical model of a subterranean hydrocarbon reservoir is described, which may be used in a history matching process. The modified realization is based on a current realization which is a function of a first uniform random number field. At least one further uniform random number field $U_i$ is created and a linear combination made of the first uniform random number field and the further uniform random number field or fields $U_i$, together with combination coefficients $r_i$, to derive a modified non-uniform random number field V. A uniform score transformation procedure is then performed, e.g. using an empirical cumulative distribution function, on the modified non-uniform number field V, to derive a modified uniform random number field $U_{mod}$. A modified realization of the model can then be derived from the uniform random number field $U_{mod}$.

9 Claims, 2 Drawing Sheets

(56) References Cited

U.S. PATENT DOCUMENTS

| | | |
|---|---|---|
| 6,618,695 B1 | 9/2003 | Hu et al. |
| 6,813,565 B1 | 11/2004 | Hu et al. |
| 6,818,695 B2 | 11/2004 | Dillion et al. |
| 7,079,953 B2 | 7/2006 | Thorne et al. |
| 7,254,091 B1 | 8/2007 | Gunning et al. |
| 7,516,055 B2 | 4/2009 | Strebelle |
| 7,558,708 B2 | 7/2009 | Le Ravalec-Dupin et al. |
| 7,630,517 B2 | 12/2009 | Mirowski et al. |
| 2006/0241925 A1* | 10/2006 | Schaaf et al. ........... 703/10 |
| 2010/0198570 A1* | 8/2010 | Sarma et al. ........... 703/10 |
| 2011/0010142 A1* | 1/2011 | Ding et al. ........... 703/2 |
| 2011/0308792 A1* | 12/2011 | Le Ravalec et al. ..... 166/250.01 |
| 2012/0215511 A1* | 8/2012 | Sarma et al. ........... 703/10 |

OTHER PUBLICATIONS

Yamamoto, Backtransforming Rank Order Kriging Estimates, Jul. 2010.*

Zhao et al., Generating Facies Maps by Assimilating Production Data and Seismic Data With the Ensemble Kalman Filter, SPE 113990, 2008.*

Zhou et al., An approach to handling non-Gaussianity of parameters and state variables in ensemble Kalman filtering, Advances in Water Resources 34 (2011) 844-864.*

Jef Caers and Tuanfeng Zhang, "Multiple-Point Geostatistics: A Quantitative Vehicle for Integrating Geologic Analogs into Multiple Reservoir Models", Stanford University, Jan. 2002, pp. 1-24.

* cited by examiner

METHOD FOR PARAMETERIZING AND MORPHING STOCHASTIC RESERVOIR MODELS

CROSS-REFERENCE TO RELATED APPLICATIONS

This application is a non-provisional application which claims the benefit of and priority to U.S. Provisional Application Ser. No. 61/405,062 filed Oct. 20, 2010, entitled "Reservoir Modelling," which is hereby incorporated by reference in its entirety.

FIELD OF THE DISCLOSURE

The present disclosure relates generally to methods for creating modified realizations of a geostatistical model of a hydrocarbon reservoir, e.g. for use in so-called history matching, in which a model is updated to take into account e.g. flow information measured from the actual reservoir.

BACKGROUND OF THE DISCLOSURE

Subsurface geological modeling involves estimating parameters of interest in a 3-d model which is used for development planning and production forecasting.

A geological reservoir model should, as far as possible, be in conformity with the geological rules or features that are specific to the depositional environment of the reservoir of interest. The geomodel also, as far as possible, needs to be conditioned to all quantitative information from well cores and logs, seismic attributes, well tests and production history, etc. Thirdly, because of our incomplete knowledge about the subsurface reservoir, there is always a degree of uncertainty that needs to be accounted for in the reservoir modeling process.

In this context, several geostatistical or probabilistic methods have been developed for geological reservoir modeling. These methods allow the building of models that are representative of various depositional environments, with various types of data being integrated into the models. In addition, the nature of the probabilistic approach makes it possible to account for uncertainty.

Once a geostatistical reservoir model is chosen to describe the reservoir of interest, one can generate, potentially, an infinite number of so-called realizations. Each realization consists of a matrix comprising several values (representing parameters such as porosity and permeability) associated with each of a large number of cells distributed over the volume of the reservoir. Only for a relatively small number of these cells will the values be known with relative certainty (namely those cells which contain parameters which have been measured). For the remaining cells, the values are estimates based on the geostatistical modeling process. Each realization will have a different set of estimated values, each realization having been generated using a different, but equally valid, random seed.

The model is used to make predictions of e.g. flow rates and pressures in wells; these are sometimes known as the "dynamic responses" predicted by the model. Data (e.g. flow rate data) will be gathered from the wells over time once the reservoir is in production and, generally, these will differ from the predicted values generated by the model. History matching is a process by which new realizations of the model are generated which predict the correct current values for e.g. flow rate and pressure, and can therefore be assumed to be more accurate and to make more accurate predictions of these values for the future. In any history matching process creating updated realizations, a good goal is to preserve the geological features and statistical data on which the model is based.

In history matching, an initial realization is modified so that the simulated dynamic responses which it predicts match with the measured ones. As mentioned above, for any modification, it is helpful if the statistical data and geological features inherent in the model are preserved. A practical reservoir model will have in excess of a million cells each associated with several values; arbitrarily changing the values in such a model is both unfeasible because there are simply too many options and also will not ensure that the geological and statistical integrity of the model is preserved. What would be helpful would be a mathematical tool which allows easy adjustments to be made which vary the values in such a way that the geological features and statistics are preserved.

U.S. Pat. No. 6,813,565 (I.F.P.) discloses a history matching technique. This technique is sometimes known as the gradual transformation method. A number of uniform random fields $U_i$, are generated from respective random seeds $S_i$. Each random field is used to generate a corresponding realization $R_i$. For history matching, a given realization is modified by modifying the uniform field which gave rise to it:

$$U_i + \Delta U \rightarrow R_i + \Delta R$$

The '565 disclosure describes linearly combining a number of fields with combination coefficients $r_i$. In the described history matching process, the combination coefficients are adjusted to vary the properties of the resulting modified uniform field and hence the realization resulting from that field. '565 describes a complex algorithm which involves converting each uniform field into a Gaussian field using a Gaussian score transformation function (sometimes called a normal score transformation or a Gaussian anamorphosis) prior to performing the linear combination, and then using an inverse Gaussian score transformation to derive a modified uniform field. This is illustrated below:

$S_i \rightarrow U_i$ (Create a number of uniform fields from seeds $S_i$)

$G(U_i) \rightarrow Y_i$ (Gaussian score transformation on each uniform field)

$\Sigma r_i Y_i \rightarrow Y_{mod}$ (Combine Gaussian fields-produce modified field)

$G^{-1}(Y_{mod}) \rightarrow U_{mod}$ (Inv. Gaussian score transformation to get uniform field)

In this approach, the parameters $r_i$ are manipulated to produce a realization which produces simulated dynamic responses matching those of the reservoir itself.

A problem arises because a modified random number field resulting from a linear combination of uniform fields (with combination coefficients $r_i$) is not itself a uniform field. In contrast, when Gaussian fields are combined linearly, it results in another Gaussian field being produced. For this reason, the algorithm described in '565 is relatively complex, involving a Gaussian score transformation of each uniform field to be combined, followed by inverse Gaussian score transformation of the modified Gaussian field produced by the linear combination step.

An alternative approach to the gradual deformation method is described in Caers, J. *Geostatistical history matching under training-image based geological model constraints.* Society of Petroleum Engineers Annual Technical Conference and Exhibition, 29 Sep.-2 Oct. 2002. In this paper, an iterative approach is described in which one parameter $r_D$ is used to make successive realizations each approaching closer to a best match with the measured reservoir data. Each iteration allows for the combination of only two realizations, which means the space of possible solutions is relatively small. This technique is sometimes known as the probability perturbation method (P.P.M.) and was initially proposed by Jef Caers of Standard University.

In contrast to the gradual deformation method,
The P.P.M. is limited to geomodel realizations generated by the sequential simulation algorithm;
It allows the combining of only two realizations at a time; and
There is no mathematical proof that the combined realization preserves the spatial statistics of the predefined geomodel.

BRIEF SUMMARY OF THE DISCLOSURE

The inventors have devised a method for performing history matching by modifying a uniform random number field without using Gaussian score transformations. The method is suitable for use in most commonly used geostatistical reservoir models, including a multiple point statistics (MPS) model. In this process, uniform random fields are linearly combined without the need for conversion to and from Gaussian fields.

One embodiment of the invention is a method for creating a modified realization of a geostatistical, stochastic, model of a subterranean hydrocarbon reservoir, wherein the modified realization is based on a current realization which is a function of a first uniform random number field. The method comprises the steps of:

Creating at least one further uniform random number field $U_i$;
Linearly combining the first uniform random number field and said at least one further uniform random number field $U_i$ together with combination coefficients $r_i$ to derive a modified non-uniform random number field V;
Performing a uniform score transformation procedure on the modified non-uniform number field V to derive a modified uniform random number field $U_{mod}$; and
Deriving the modified realization of the model from the modified uniform random number field $U_{mod}$.

The uniform score transformation is a known mathematical process in its own right, but it is not commonly used in the field of geological modeling.

One way of summarizing this concept would be:
$S_i \rightarrow U_i$ (Create a number of uniform fields from seeds $S_i$)
$\Sigma r_i U_i \rightarrow V_{mod}$ (Combine uniform fields to produce modified field)
$T(V_{mod}) \rightarrow U_{mod}$ (Uniform score transform to get uniform field)

One advantage of this method is that the need for multiple Gaussian score and inverse Gaussian score transformations is eliminated. Another advantage is that it is possible to have a potentially infinite range of values for the combination coefficients $r_i$, so that the history matching process can be performed within a much larger space of possible solutions. When Gaussian fields are used, it is normally necessary in order to keep to a standard Gaussian distribution for the sum of the squares of $r_i$ to be 1, otherwise further transformations from non-standard to standard Gaussian fields are normally required. When working directly with uniform fields, however, there is no need for $r_i$ to be limited in this way, so that it is even possible to have $r_i \in (-\infty, \infty)$.

In one embodiment, one can set $r_i = tg(\pi \rho_i / n)$ where n is an integer. In this case, when e.g. n=2, $r_i$ ranges from $-\infty$ to $\infty$, that is to say $r_i \in (-\infty, \infty)$, when $\rho_i$ ranges between $-1$ and $1$. When e.g. n=4, $r_i$ ranges from $-\infty$ to $\infty$, that is to say $r_i \in (-\infty, \infty)$, when $\rho_i$ ranges between $-2$ and $2$, and when $\rho_i = 1$, $r_i = 1$, and when $\rho_i = -1$, $r_i = -1$. In this way, one can have a small finite range of the parameter $\rho_i$ which can be varied in the history matching process, which produces a potentially infinite range of values for $r_i$. The history matching process can thus be performed in a much larger space of possible solutions.

The method may be used with most common models, e.g. (i) sequential Gaussian simulation, (ii) truncated Gaussian simulation, (iii) sequential indicator simulation, (iv) multiple point statistics (MPS). There are basically two types of stochastic simulation: Gaussian (e.g. (i) and (ii) above) and non-Gaussian (e.g. MPS). Although Gaussian modeling employs a Gaussian field, there is always an underlying uniform field; therefore the method may be used where the geostatistical model is a Gaussian model, by modifying the uniform field or fields underlying the Gaussian field or fields. This allows the method to be used with both Gaussian and non-Gaussian models.

The gradual deformation method converts the underlying uniform field to a Gaussian field so that the linear combination of the fields remains Gaussian; however, most model types would benefit from the simplified processing and other benefits of the direct use of uniform random fields together with a uniform score transform as described herein.

In one embodiment, the method is applied to a multiple point simulation model or multiple point statistics model.

Another feature of the method may be that the sum of the squares of $r_i$ is not limited to 1 as is normal when combining Gaussian fields in order to keep them as standard Gaussian fields. In this way, the range of $r_i$ may be larger, allowing the space of possible solutions to be increased. Optionally, $r_i \in (-\infty, \infty)$.

A history matching method may incorporate the method. A parameter $\rho_i$ may be varied to achieve a history match solution, where $r_i$ is a trigonometric function of $\rho_i$ such that a given numerical range of $\rho_i$ may corresponds to a larger numerical range of $r_i$. Optionally, $r_i = tg(\pi \rho_i / n)$, n being an integer. History matching is the creation of a modified realization of the geostatistical model which predicts current production data with greater accuracy than the initial realization.

An empirical cumulative distribution function may be used to perform the uniform score transformation.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of an embodiment of the present invention, it should be understood that the inventive features and concepts may be manifested in other embodiments and that the scope of the invention is not limited to the embodiment described or illustrated. The scope of the invention is intended only to be limited by the scope of the claims that follow.

Let $U_1, U_2, \ldots, U_n$ be a series of independent random fields of white noise that follows the uniform distribution between 0 and 1. We define a new random field V as a linear combination of $U_1, U_2, \ldots, U_n$ $$V(r_1, r_2, \ldots, r_n) = \sum_{i=1}^{n} r_i U_i$$

where $r_i \in (-\infty, +\infty)$ are the combination coefficients. In practice, it is more convenient to put $$r_i = tg\left(\frac{\pi \rho_i}{2}\right)$$

and to use $\rho_i \in (-1, 1)$ as parameters instead of $r_i$.

Figure 1:
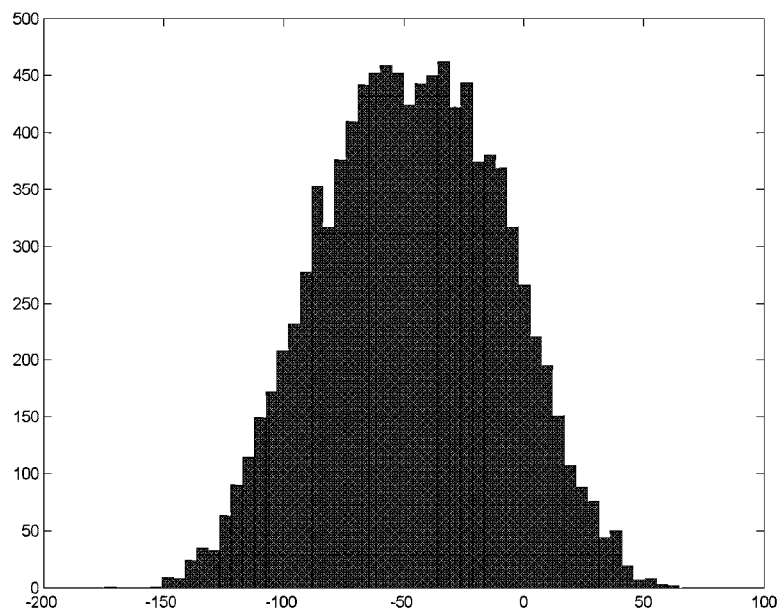
FIG. 1 is a histogram of a linear combination of 100 uniform random fields.

The mean of V equals $\Sigma_i r_i/2$ and the variance of V equals $\Sigma_i r_i^2/12$. However, unlike the linear combination of Gaussian random fields that remains Gaussian, the linear combination of uniform random fields is no longer uniform, except for the trivial cases where $r_i=1$ and $r_j=0$ for $j=1, \ldots, i-1, i+1, \ldots, n$. This can be seen from FIG. 1 which shows the histogram of a linear combination of 100 uniform random fields, which is clearly not uniform.

Nevertheless, we can transform V into a uniform field U by the uniform anamorphosis (uniform score transformation)

$$U(r) = F[V(r)]$$

where r stands for the parameter vector $(r_1, r_2, \ldots, r_n)$, and $F[\cdot]$ the cumulative distribution function (cdf) of V.

Figure 2:
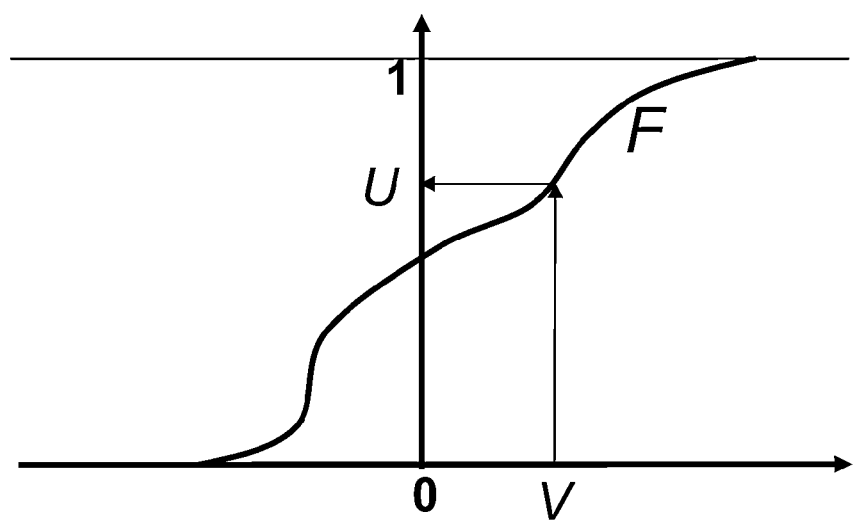
FIG. 2 is a diagram of a cumulative distribution function and its use to perform a uniform score transformation on a non-uniform linear combination of uniform random fields.

Except for small number n, it is very tedious to derive the analytical expression of $F[\cdot]$. In practice, we resort to the empirical distribution of V to calculate U. This is shown in FIG. 2: on the X axis in FIG. 2 are all the possible values in the combined field, whilst the Y axis represents a probability value between 0 and 1. The empirical cumulative distribution function takes into account the number of uniform fields which have been combined as well as the weightings (coefficients), and can be used as shown in FIG. 2 to derive the probability associated with each of the possible values in the combined field. In this way a uniform probability (random number) field is derived from the non-uniform combined field.

Figure 3:
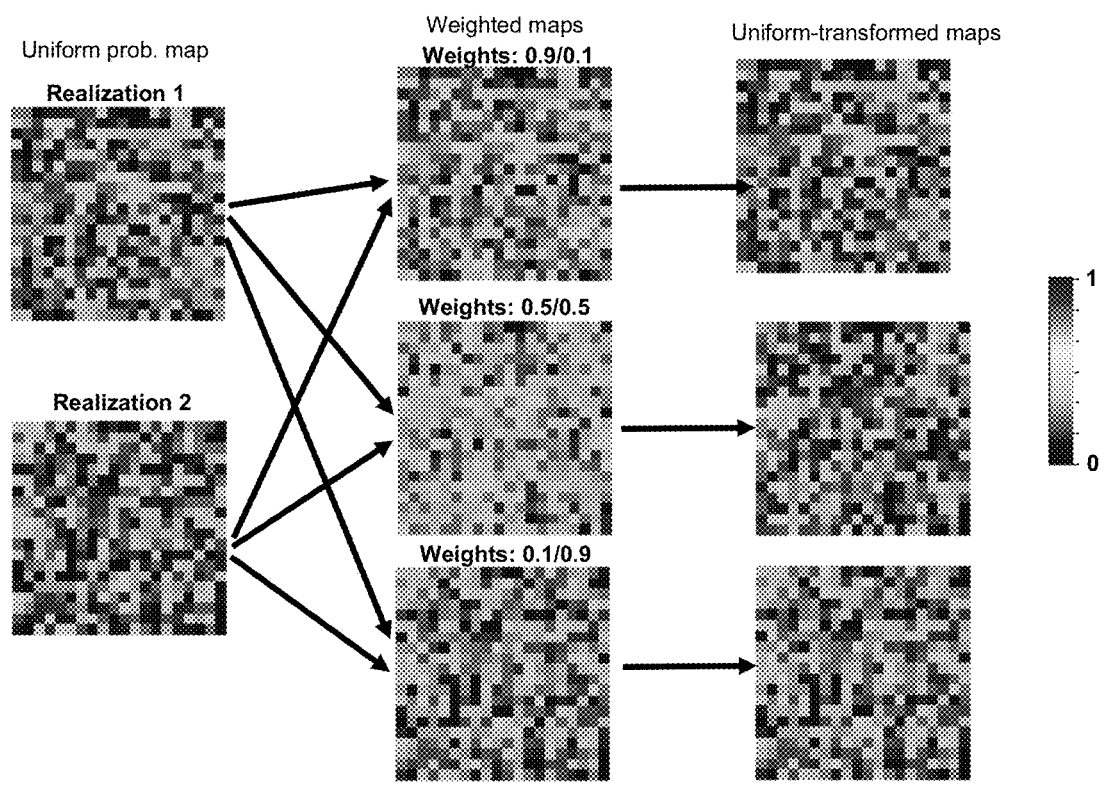
FIG. 3 is a graphic illustration of the combination of uniform random number fields.

FIG. 3 shows graphically how different uniform random fields, in this case having only a few hundred numbers, can be combined with different weightings ($r_i$). The combined fields (centre column of images in FIG. 3) are non-uniform; their different appearance can be seen in FIG. 3. Applying the uniform score transformation results in the images in the right hand column in FIG. 3; the fields are different from the original (left hand column) fields, but they have a similar appearance because they are uniform.

Now, given its definition and its structural or statistical parameters, a geostatistical reservoir model (or a geomodel) M can be considered as a function of a uniform random number field U. With the uniform field U represented by a combination of a set of independent uniform fields $U_i$, the geomodel is reparameterized as a function of a set of combination coefficients $(\rho_1, \rho_2, \ldots, \rho_n)$.

$$M(U) = M\left\{F\left[\sum_i tg\left(\frac{\pi \rho_i}{2}\right)U_i\right]\right\}$$

Once a realization is generated for each $U_i$, the coefficients $\rho_i$ can be identified through an optimization procedure to produce a history matched realization of the geomodel.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method for creating a modified realization of a geostatistical model of a subterranean hydrocarbon reservoir with the aid of a digital computer, wherein the modified realization is based on a current realization which is a function of a first uniform random number field, the method comprising the steps of:
   a) creating at least one further uniform random number field $U_i$;
   b) linearly combining the first uniform random number field and said at least one further uniform random number field $U_i$ together with combination coefficients $r_i$ to derive a modified non-uniform random number field V, wherein a sum consisting of a square of each combination coefficient of said combination coefficients is not limited to 1;
   c) performing in the computer a uniform score transformation procedure on the modified non-uniform number field V to derive a modified uniform random number field $U_{mod}$; and
   d) deriving the modified realization of the geostatistical model from the modified uniform random number field $U_{mod}$.

2. The method of claim 1, wherein the geostatistical model is a non-Gaussian model.

3. The method of claim 2, wherein the geostatistical model is a multiple point simulation model or multiple point statistics model.

4. The method of claim 1, wherein the geostatistical model is a Gaussian model.

5. The method of claim 1, wherein $r_i \in (-\infty, \infty)$.

6. The method of claim 1, wherein an empirical cumulative distribution function is used to perform the uniform score transformation.

7. A history matching method comprising creating a modified realization of a geostatistical model of a subterranean hydrocarbon reservoir with the aid of a digital computer, wherein the modified realization is based on a current realization which is a function of a first uniform random number field, the method comprising the steps of:
  a) creating at least one further uniform random number field $U_i$;
  b) linearly combining the first uniform random number field and said at least one further uniform random number field $U_i$ together with combination coefficients $r_i$ to derive a modified non-uniform random number field V, wherein a sum consisting of a square of each combination coefficient of said combination coefficients is not limited to 1;
  c) performing in the computer a uniform score transformation procedure on the modified non-uniform number field V to derive a modified uniform random number field $U_{mod}$; and
  d) deriving the modified realization of the geostatistical model from the modified uniform random number field $U_{mod}$.

8. The method of claim 7, wherein a parameter $\rho_i$ is varied to achieve a history match solution, where $r_i$ is a trigonometric function of $\rho_i$ such that a given numerical range of $\rho_i$ corresponds to a larger numerical range of $r_i$.

9. The method of claim 7, wherein $r_i = tg(\pi \rho_i / n)$, n being an integer.

* * * * *